(12) United States Patent
Cohen et al.

(10) Patent No.: US 8,164,220 B2
(45) Date of Patent: *Apr. 24, 2012

(54) APPARATUS, SYSTEM AND METHOD FOR A UPS

(75) Inventors: Daniel C. Cohen, Newton, MA (US); David A. Colucci, Lynnfield, MA (US); Mark R. Melanson, Chelmsford, MA (US); James S. Spitaels, Shrewsbury, MA (US)

(73) Assignee: American Power Conversion Corporation, West Kingston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/868,256

(22) Filed: Aug. 25, 2010

(65) Prior Publication Data

US 2011/0181108 A1  Jul. 28, 2011

Related U.S. Application Data

(63) Continuation of application No. 12/061,397, filed on Apr. 2, 2008, now Pat. No. 7,786,618.

(51) Int. Cl.
*H02J 7/00* (2006.01)
(52) U.S. Cl. .......................................................... 307/65
(58) Field of Classification Search ...................... 307/65
See application file for complete search history.

(56) References Cited

U.S. PATENT DOCUMENTS

| | | | |
|---|---|---|---|
| 4,611,289 A * | 9/1986 | Coppola | 713/300 |
| 5,381,554 A | 1/1995 | Langer et al. | |
| 5,534,734 A * | 7/1996 | Pugh et al. | 307/38 |
| 5,793,124 A | 8/1998 | Mitzaki | |
| 6,741,442 B1 | 5/2004 | McNally et al. | |
| 7,015,599 B2 | 3/2006 | Gull et al. | |
| 7,242,111 B2 | 7/2007 | Menas et al. | |
| 7,432,615 B2 | 10/2008 | Hjort | |
| 7,498,692 B2 | 3/2009 | Grolnic et al. | |
| 2003/0125886 A1 | 7/2003 | Spitaels et al. | |
| 2005/0052805 A1 | 3/2005 | Sato et al. | |
| 2005/0189817 A1 | 9/2005 | Johnson, Jr. et al. | |
| 2005/0278075 A1 | 12/2005 | Rasmussen et al. | |
| 2007/0220301 A1* | 9/2007 | Brundridge et al. | 714/4 |
| 2007/0291430 A1 | 12/2007 | Spitaels et al. | |

FOREIGN PATENT DOCUMENTS

WO  8808218  10/1988

OTHER PUBLICATIONS

International Search Report and Written Opinion mailed Jun. 30, 2009 corresponding PCT application No. PCT/US2009/002072.

* cited by examiner

*Primary Examiner* — Robert L. Deberadinis
(74) *Attorney, Agent, or Firm* — Lando & Anastasi, LLP

(57) ABSTRACT

According to one aspect of the invention, a UPS includes an input configured to be coupled to an AC power source, a DC power source, an output configured to receive power from at least one of the AC power source and the DC power source, a first switched receptacle outlet coupled to the output and configured to be coupled to a first electrical load and a second receptacle outlet coupled to the output and configured to be coupled to a second electrical load. According to some embodiments, the UPS also includes a control unit configurable to provide a first configuration associated with the first switched receptacle outlet, where the first configuration is employed by the control unit to control a connection of the first switched receptacle outlet to the output independent of the second receptacle outlet.

19 Claims, 4 Drawing Sheets

APPARATUS, SYSTEM AND METHOD FOR A UPS

CROSS REFERENCE TO RELATED APPLICATIONS

This application is a continuation of and claims the benefit under 35 U.S.C. §120 to U.S. application Ser. No. 12/061,397, filed on Apr. 2, 2008 entitled "Apparatus, System and Method for a UPS" now U.S. Pat. No. 7,786,618, which is hereby incorporated herein by reference in its entirety for all purposes.

BACKGROUND OF INVENTION

1. Field of Invention

Embodiments of the invention relate to uninterruptible power supplies. More specifically, at least one embodiment relates to an apparatus, system and method for independently controlling the power outlets of a UPS.

2. Discussion of Related Art

At present, uninterruptible power supplies ("UPS") sometimes include one or more receptacle outlets that can be isolated by the UPS, for example, to shut down a connected load before the batteries of the UPS are fully discharged. Other UPSs may isolate one or more receptacle outlets when the load supplied from a master outlet which is not switched is reduced below a minimum value. Other UPSs employ a serial communication network to provide a UPS with an indication that loads connected to a plurality of receptacle outlets have been shut down so that the UPS can then shut down itself. However, such an approach treats a plurality of receptacle outlets and the corresponding plurality of electrical loads as a single load. As a result, a configuration of an operational sequence for powering down the load is not customized for the individual electrical loads. Often, the load includes one or more servers that ideally are shut down in a particular fashion to avoid a loss of data and rebooted at the appropriate moment following the restoration of power. Thus, known UPS systems do not adequately provide for an individualized approach for shutting down, isolating and subsequently rebooting the servers.

For example, some prior art UPSs included a plurality of receptacle outlets which supply power to separate electrical loads via separate power circuits where, for example, each receptacle outlet is connected to one of the respective loads. Such a UPS may be included in a system that also includes a communication device. According to one approach, the communication device allows communication from a single serial port to a single device that can communicate with a plurality of electrical loads, for example, computers and/or servers. One or more of the receptacle outlets may be switchable such that power may be turned off to one or more of the loads based on an established set of conditions that may include a condition of the UPS and/or a condition of the load.

SUMMARY OF INVENTION

As outlined above, prior approaches provide a single shutdown configuration and do not allow the UPS to independently control the switched receptacle outlets. That is, the communication device may provide the UPS with a signal indicating that all of the connected loads are ready to be shutdown. The UPS can then turnoff power supplied to the receptacle outlets. Thus, prior systems are unable to individually communicate with a plurality of electrical loads and are therefore unable to independently turn off power to a single receptacle outlet or group of receptacle outlets. Instead, these prior systems turn off power to all the switched receptacle outlets (or groups of receptacle outlets) included in the UPS.

In accordance with some embodiments, the invention provides a UPS that includes a plurality of configurations for turning off power supplied to switched receptacle outlets in the UPS where, for example, a first configuration is associated with a first receptacle outlet(s) and a second configuration is associated with a second receptacle outlet(s). Further, these configurations can allow each of the first receptacle outlet(s) and the second receptacle outlet(s) to be turned off independent of the status (connected, disconnected, current draw, etc.) of the other. As a result, according to one embodiment, configurations can be customized to, for example, prioritize the shutdown of connected loads to allow the most critical loads to operate for greater periods following the loss of primary power supplied to the UPS.

According to one aspect of the invention, a UPS includes an input configured to be coupled to an AC power source, a DC power source, an output configured to receive power from at least one of the AC power source and the DC power source, a first switched receptacle outlet coupled to the output and configured to be coupled to a first electrical load and a second receptacle outlet coupled to the output and configured to be coupled to a second electrical load. According to some embodiments, the UPS also includes a control unit configurable to provide a first configuration associated with the first switched receptacle outlet, where the first configuration is employed by the control unit to control a connection of the first switched receptacle outlet to the output independent of the second receptacle outlet. In a further embodiment, the control unit controls the connection of the first switched receptacle outlet independent of a status of the second electrical load. In another embodiment, the control unit controls the connection of the first switched receptacle outlet independent of a status of a connection of the second receptacle outlet to the UPS output.

According to another aspect, the invention provides a method of independently controlling at least a first power outlet included in a UPS relative to a second power outlet included in the UPS, the first power outlet coupled to an output of the UPS and supplying power to a first electrical load and the second power outlet coupled to the output of the UPS and supplying power to a second electrical load. In some embodiments, the method includes acts of configuring the UPS to operate to turn off power to the first power outlet based on a first condition that is independent of the second power outlet and the second electrical load, where the first condition concerns at least one of a status of the UPS and a status of the first electrical load.

According to a further aspect of the invention, a computer readable medium stores sequences of instructions including instructions that will cause a processor to perform a method of isolating a first power outlet included in a UPS from an output of the UPS where the UPS also includes a second power outlet configured to be coupled to an electrical load. In some embodiments, the method includes acts of receiving configuration information, including information concerning a first condition that is independent of the second power outlet and the second electrical load, and determining whether to disconnect the first power outlet from the output based on the first condition. According to a further embodiment, the first power outlet is configured to supply power to a first electrical load, and the first condition concerns at least one of a status of the UPS and a status of the first electrical load.

BRIEF DESCRIPTION OF DRAWINGS

The accompanying drawings, are not intended to be drawn to scale. In the drawings, each identical or nearly identical

DETAILED DESCRIPTION

Figure 1:
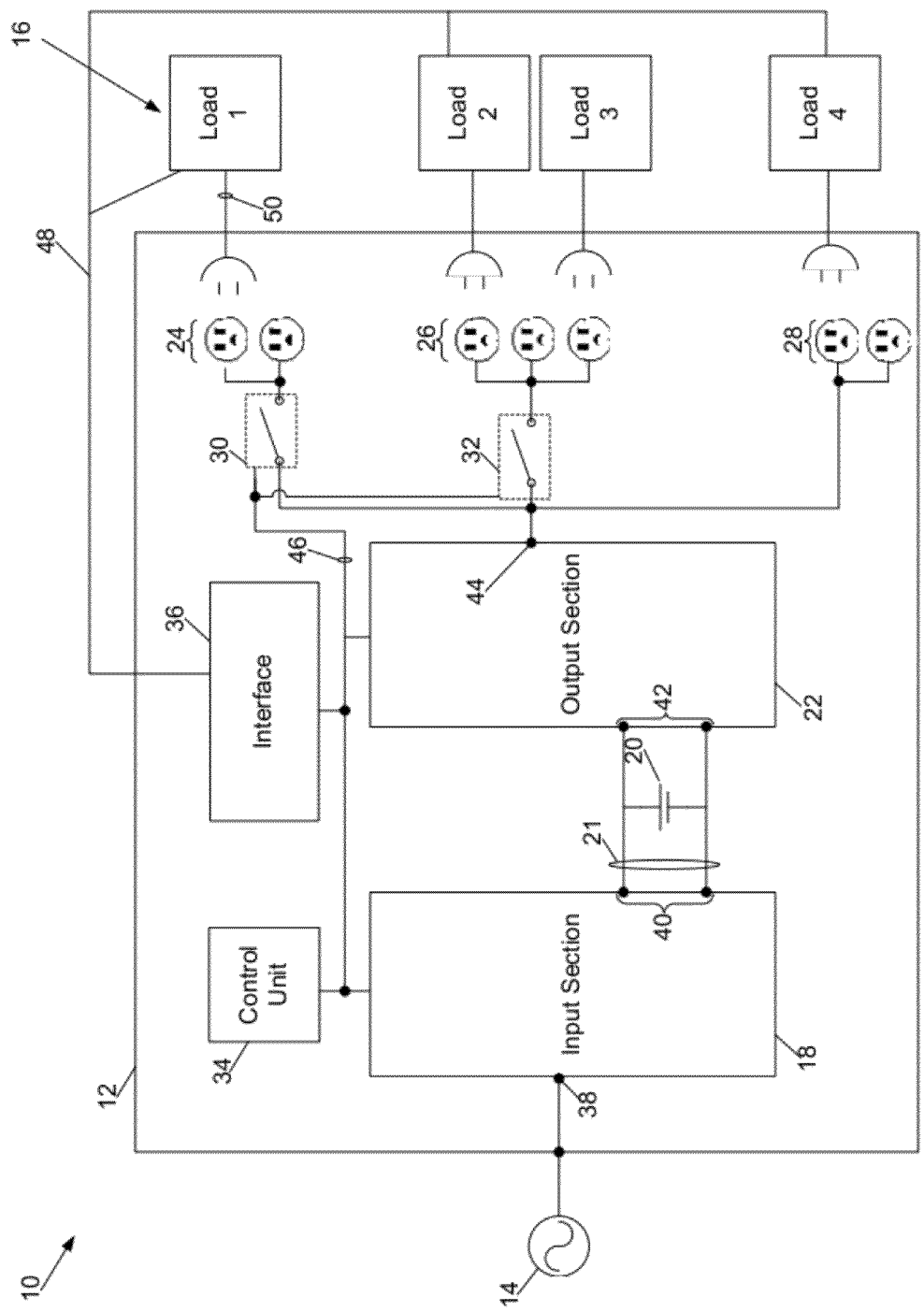
FIG. 1 illustrates a system including a UPS in accordance with one embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

FIG. 1 illustrates a system 10 in accordance with one embodiment. The system includes a UPS 12, an AC power source 14, and electrical load 16. In the illustrated embodiment, the UPS 12 includes an input section 18, a battery 20, and an output section 22. In addition, the UPS includes a first receptacle outlet 24, a second receptacle outlet 26, and a third receptacle outlet 28. In various embodiments, each of the first receptacle 24, the second receptacle 26 and the third receptacle 28 may include a plurality of receptacle outlets, for example, as illustrated in FIG. 1. In accordance with one embodiment, the UPS 12 also includes one or more switching devices, for example, a first switching device 30 and a second switching device 32. In some embodiments, all the receptacle outlets included in the UPS may be supplied via a switching device, that is, all of the outlets may be switched outlets. While in other embodiments, some of the receptacle outlets, for example, the receptacle outlet 28, may be unswitched. The UPS 12 can also include a control unit 34 and an interface 36.

In the illustrated embodiment, the input section includes an input 38 and an output 40. Further, the output section may include an input 42 and an output 44. According to one embodiment, the output 44 is included in the output of the UPS 12. The UPS 12 also includes a DC bus 21 that is connected to the battery 20. In accordance with one embodiment, the input 38 of the input section 18 is connected to the source of AC power 14 and the output 40 is connected to the DC bus 21. In a further embodiment, the DC bus 21 is connected to the input 42 of the output section 22 and the output 44 is connected to one or more of the receptacle outlets 24, 26 and 28. In some embodiments, the output 44 of the output section 22 is connected to one or more of the receptacle outlets via a switching device, for example, the switching devices 30 and 32 illustrated in FIG. 1.

In some embodiments, the UPS 12 includes a communication link 46 that connects the control unit 34 to one or more of the input section 18, the output section 22, the interface 36, the first switching device 30 and the second switching device 32. According to one embodiment, the communication link 46 includes two or more distinct communication links. For example, the communication between the control unit 34 and the switching devices 30, 32 includes discrete I/O. Alternatively, the communication between the control unit 34 and the switching devices 30, 32 can be accomplished by another type of microprocessor bus such as SPI, I2C and RS-232. In a further embodiment, any of the preceding can be employed in combination with separate communication between the control unit 34 and the interface 36. That is, the control unit 34 and the switching devices 30, 32 can communicate over a microprocessor bus while the control unit 34 and the interface 36 employ a higher level communication protocol running on a serial or a parallel interface. In one embodiment, communication between the control unit 34 and the interface 36 employs a Micro-link protocol running on a UART. In various embodiments, the communication link 46 allows bi-directional communication between the control unit 34 and the interface 36 to, for example, allow bi-directional communication between the control unit 34 and the load 16 via the interface 36 and the communication network. Further, according to one embodiment, the interface 36 can be included in the control unit 34.

In accordance with one embodiment, the system 10 may also include a communication network 48 that connects the interface 36 of the UPS 22 to one or more of the electrical loads 16. In various embodiments, the communication network may include one or more of a local area network, a wide area network or a combination of the preceding and additional communication networks. According to one embodiment, the communication network 48 includes the Internet. In another embodiment, the communication network includes an Ethernet network with, for example, multiple sessions for the connected loads. In yet another embodiment, the communication network 48 can include multiple dedicated serial lines where, for example, a first serial line is dedicated to load 1, a second serial line is dedicated to load 2 and a third serial line is dedicated to load 4.

In one embodiment, each of the input section 18 and the output section 22 include power conversion circuitry. For example, in one embodiment, the input section 18 includes a rectifier and power regulator to convert the AC input power to a DC output supplied to the DC bus 21. In accordance with a further embodiment, the output section includes an inverter and filter circuitry to convert the DC supplied at the input 42 to AC power provided at the output 44. The invention is not limited to any particular style or type of power conversion circuitry and the block diagram illustrated in FIG. 1 is merely exemplary. For example, FIG. 1 generally illustrates an on-line UPS configuration, however, the UPS 12 need not be an on-line UPS and embodiments may be employed with other styles and types of uninterruptible power supplies. Further, in accordance with some embodiments, the UPS 12 includes a bypass that allows a user to bypass all or some portion of the input section 18 and the output section 22 to connect the source of AC power 14 to one or more of the receptacle outlets 24, 26, 28. Further, in accordance with some embodiments, the battery 20 may be located external to the UPS 12. In a further embodiment, the UPS 12 includes integral batteries 20 in combination with additional external batteries.

In general, the UPS 12 operates to continue to supply power to the receptacle outlets 24, 26, 28 even when the AC power source 14 (the primary power source) is unavailable. In the illustrated embodiment, the battery 20 is employed to supply power to the receptacle outlets via the output section 22. However, according to some embodiments batteries are either not employed (where for example a backup AC power source, or an alternate source of DC power is available) or are employed in combination with another source of DC power, for example, a fuel cell.

In accordance with some embodiments, the control unit 34 is a microcontroller, for example, a digital signal processor ("DSP"). In one embodiment, the control unit 34 includes a model TMS320F2810 DSP manufactured by Texas Instruments. According to one embodiment, the control unit 34 operates to control operation of either or both of the input section 18 and the output section 22, for example, to control the power that is drawn from the AC power source 14, the DC voltage produced on the DC bus 21 and the AC power produced at the output 44. In particular, the control unit may control operation of circuitry including one or more switching devices, for example, solid-state switching devices, located in either or both of the input section 18 and the output section 22.

In various embodiments, the control unit 34 includes hardware, software or a combination of hardware and software. According to some embodiments, the control unit 34 include memory to store one or more algorithms that are executed to determine whether either or both of the first switching device 30 and the second switching device 32 should operate to disconnect the first receptacle outlet and the second receptacle outlet 24 from the output 44 based on a first set of conditions. In one embodiment, the control unit 34 generates a signal which is communicated over the communication link 46 to the first switching device 30 to operate the first switching device when the first set of conditions are reached. In a further embodiment, the control device 34 can be configured to store a plurality of configurations where each configuration includes a condition or conditions associated with isolation of a receptacle outlet. For example, the control unit 34 may include a first configuration including a first condition or set of conditions the occurrence of which results in a signal being communicated from the control device to the switching device 30 to open the switching device to disconnect the first receptacle outlet 24 from the output 44. In addition, the control unit 34 may include a second configuration including a second condition or set of conditions the occurrence of which results in a signal being communicated from the control device to the switching device 32 to open the switching device to disconnect the second receptacle outlet 26 from the output 44.

In some embodiments, the preceding operations of the first switching device 30 and the second switching device 32 occur independent of the operation of the other. Thus, the first switching device 30 may operate to isolate the first receptacle outlet 24 from the output 44 while the second switching device 32 remains closed. As a result, the load 2 and the load 3 which are connected to the second receptacle outlet 26 remain connected to the output 44 via the second switching device 32. According to various embodiments, the independent control of the connection of the first receptacle outlet 24 and the second receptacle outlet 26 allows operation of the UPS 12 for a longer period following a loss of AC power at the input 38.

Further, the control unit may also be programmed to disconnect the second receptacle outlet 26 from the output 44 independent of the control of the first receptacle outlet 24. According to one embodiment, operation of the second switching device 32 is based on the second set of conditions which may be the same as or different than the first set of conditions.

In accordance with one embodiment, each of the switching devices 30, 32 include a relay, for example, an electromechanically operated relay. In another embodiment, the switching devices 30, 32 include an electronic switching device such as a power transistor, MOSFET, etc.

The receptacle outlets 24, 26, 28 illustrate receptacle outlets in accordance with one embodiment and provide one example. The style and type of the receptacle outlets 24, 26, 28, however, may vary according to the embodiment and the invention is not limited for use with any one style or type of receptacle outlet. For example, in one embodiment, the receptacle outlets comply with one of the IEC Standards, for example, IEC 320-C19 or IEC 320-C13. In a further embodiment, one or more of the receptacle outlets comply with NEMA Standards. In addition, although the UPS 12 includes receptacle outlets, it could alternatively include plugs such that the load or an associated power cord includes a receptacle outlet suitable for connection to the plug included in the UPS. The difference between the preceding approaches is the location of the male terminals. Further, the receptacle outlet need not be suitable solely for plugs using a blade-type male connection but may also be configured for pin-and-sleeve type connectors.

In accordance with one embodiment, each of the load 1, the load 2, the load 3 and the load 4, respectively, are connected to the corresponding receptacle outlet by a power cord, for example, the power cord 50.

The UPS 12 may be employed with any type of load for which it has a capacity to supply power. For example, the load may include one or more computers, for example, servers. The load may also include peripheral devices related to the computer, for example, printers or other devices. Where the receptacle outlet includes a plurality of outlets (for example, receptacle outlet 26) and connected loads (for example, the load 2 and the load 3), the UPS may communicate with only one of the loads supplied from that group of outlets, as illustrated. Alternatively, the network 48 may allow communication between the UPS and each of the connected loads, for example, each of the load 2 and the load 3. According to one embodiment, each of the load 2 and the load 3 are communicate with the UPS via the network 48, however, they are disconnected from (and reconnected to) the output of the UPS 12 together because they are supplied from outlets included in a common group of receptacle outlets.

In accordance with various embodiments, the interface 36 may communicate with the load 16 over one or more of a local area network, a wide area network or a combination of the preceding and any additional communication networks. In accordance with one embodiment, the network employs a web-based protocol such as HTTP or SNMP. Other protocols may also be used including Ethernet and Wi-Fi. In a further embodiment, a UDP-based propriety protocol is employed.

In some embodiments, the interface 36 allows the control unit 34 to be programmed over the network 48, for example, using a web-based protocol. According to one embodiment, a user remote from the UPS 12 programs the control unit for one or more configurations (and associated conditions) with the web-based protocol over the network.

In some embodiments, the interface 36 provides a connection for serial communication. In a further embodiment, the interface 36 can include a user interface (for example, a graphical user interface) that allows a user to configure the control unit 34 locally at the UPS.

Figure 2:
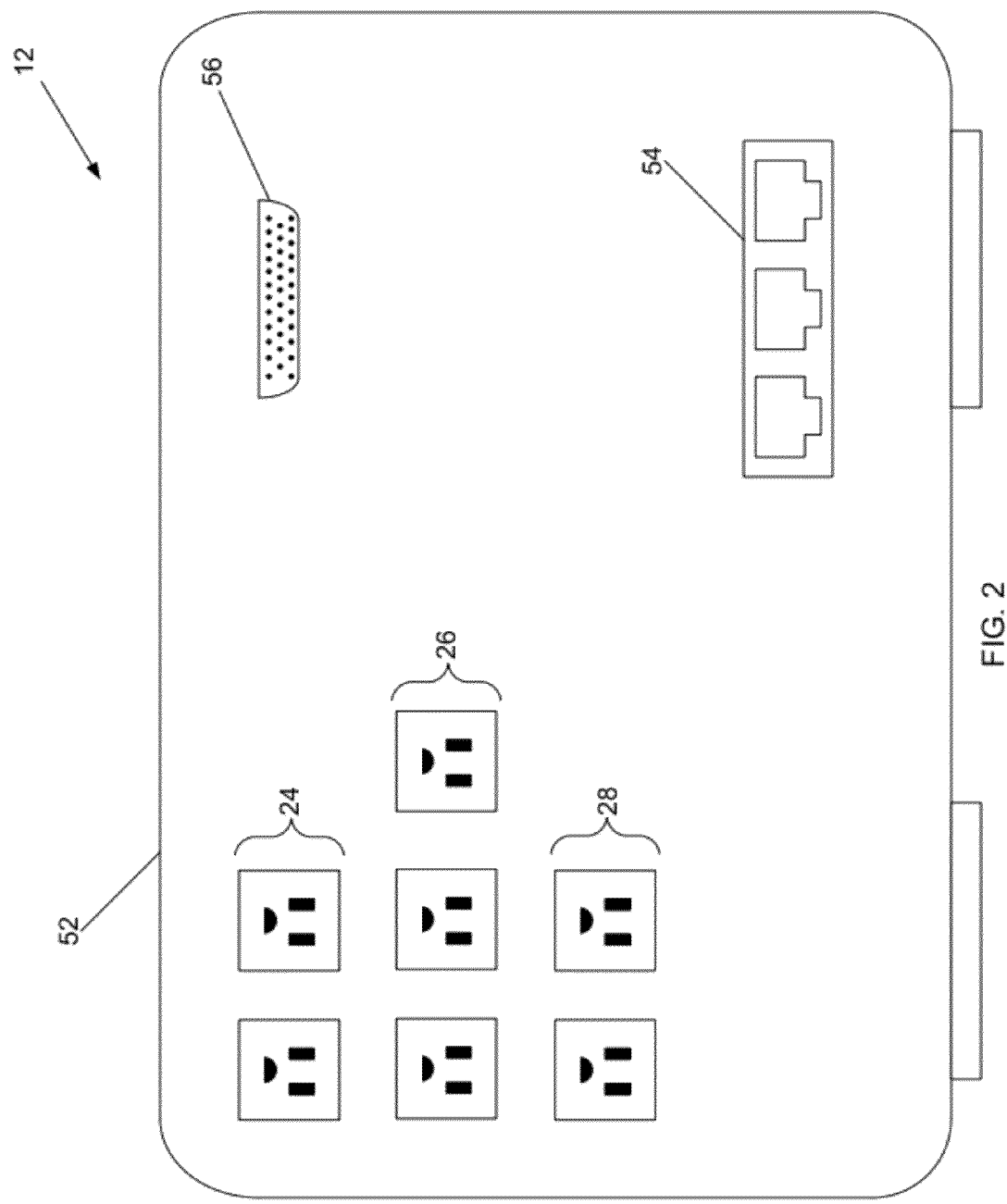
FIG. 2 illustrates a plan view of an exterior of a UPS housing in accordance with one embodiment of the invention.

Referring now to FIG. 2, a UPS 12 is illustrated. According to the illustrated embodiment, the UPS 12 includes a housing 52, the first receptacle outlet 24, the second receptacle outlet 26, the third receptacle outlet 28, a network interface 54 and a serial communication port 56. According to one embodiment, the receptacle outlets are located at an exterior surface of the housing 52. As a result, a user is provided with easy access to switched receptacle outlets integral to the UPS. According to one embodiment, the receptacle outlets 24, 26, 28 are flush mounted relative to the exterior surface. In another embodiment, the receptacle outlets 24, 26, 28 are not flush mounted but can instead be recessed or project beyond the exterior surface. In addition, each of the network interface 54 and the serial communication port 56 can also be located at the exterior surface of the housing. According to one embodiment, the UPS 12 includes the network interface but does not include the serial communication port 56. In an alternate embodiment, the UPS 12 includes the serial communication port 56 but does not includes the network interface 54.

As mentioned above, in some embodiments, the UPS 12 can include customized configurations that are employed to control operation of the switching devices 30, 32 to control the connection of electrical load to an output of the UPS. According to one embodiment, the configurations may included conditions concerning either or both of the status of the electrical load and the status of the UPS. According to one embodiment, the status of the UPS can include whether AC power is available at the input 38. Further, the configurations may be established to prioritize the supply of power to a first receptacle outlet and a second receptacle outlet relative to one another. For example, the configurations can include operating a selected one of the switching devices to open the switching device and turn off the load connected to it where the operation occurs: 1) immediately upon loss of the primary AC power source; 2) subsequent to the loss of the primary AC power source once the connected load communicates that it is ready for shutdown; or 3) based on a charge status and/or capacity of the DC power source. According to one embodiment, the preceding are referred to as shutdown conditions, that is, selected receptacle outlet(s) are shutdown once the conditions are met.

Further, the configurations may include time-based conditions where one or more timers are be set such that the operation of the switching devices 30, 32 is done in a particular sequence or as a result of a particular set of circumstances, for example, operational circumstances concerning either or both of the UPS 12 and the electrical load 16. In some embodiments, it is advantageous that the UPS 12 can execute shutdown procedures without continuous communication with the connected load. That is, the UPS may complete a procedure to shutdown a receptacle outlet(s) once the procedure is started. The preceding is true even for procedures that are initiated by the conditions of the electrical load because the procedure can be completed once started without further knowledge of the state of the electrical load (where for example further network communication with the load is not available). In accordance with a further embodiment, the network communication is not required once the UPS is programmed with the shutdown conditions.

In a further embodiment, the UPS 12 may be configured to re-close the switching device to reconnect the receptacle outlet(s) to the output when AC power is restored, for example, at the input 38. In accordance with some embodiments, the control unit may also be set for a variety of reboot options. For example, a first receptacle outlet(s) may be reconnected to the output of the UPS as soon as AC power is restored at the input 38 (this may be the condition established for the most critical electrical load). In addition, a second receptacle outlet(s) may be reconnected to the output of the UPS following a predetermined amount of elapsed time subsequent to the restoration of AC power at the input 38. As another option, a receptacle outlet(s) may be reconnected to the output of the UPS when the charge state of the DC power source reaches a predetermined threshold. Where a plurality of switched receptacle outlets are employed, the preceding conditions can be customized to, for example, provide a coordinated and staggered power restoration to separate groups of loads.

The above-described approach can allow a UPS to include a plurality of discrete configurations where each configuration is employed to independently control one or more receptacle outlets that are separate from other receptacle outlets that may also be independently switched. As a result, a single UPS may provide a level of control over switched receptacle outlets that from a conceptual standpoint provides a plurality of "virtual" UPSs within a single UPS.

Figure 3:
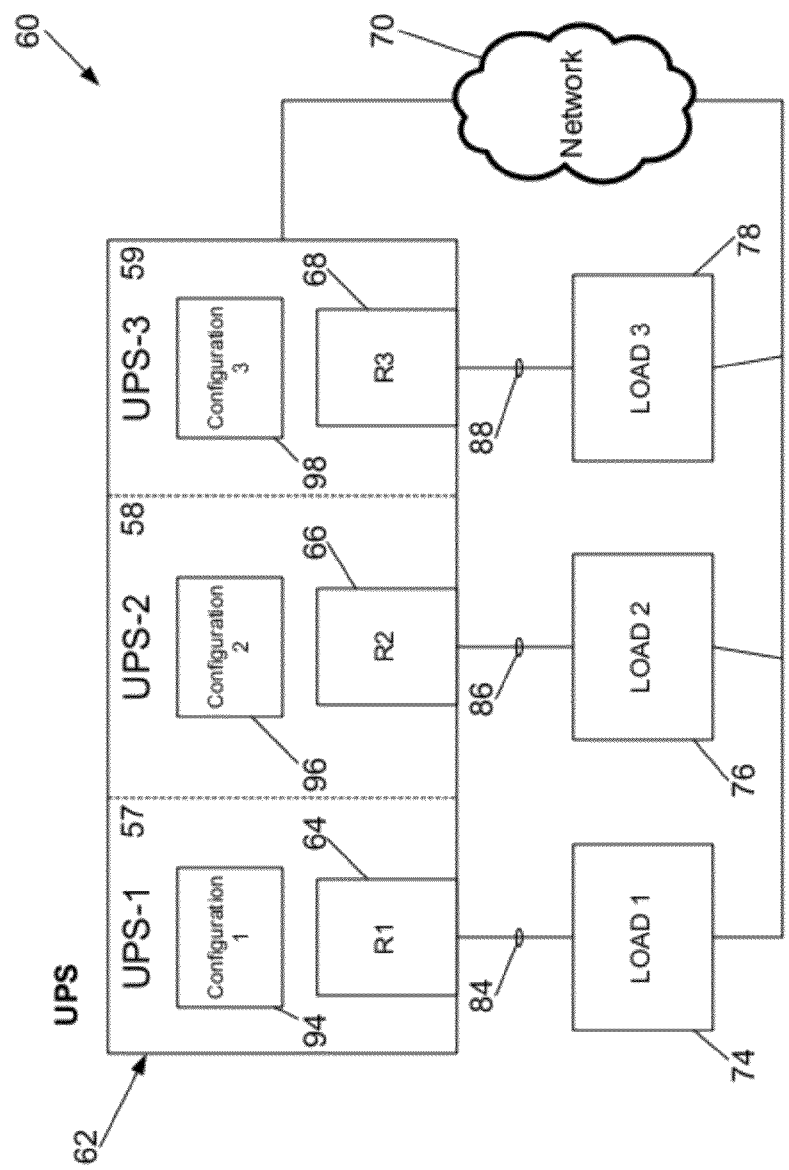
FIG. 3 illustrates a high-level block diagram of a UPS in accordance with an embodiment of the invention.

Referring now to FIG. 3, a system 60 includes a UPS 62 that includes a first receptacle outlet 64, a second receptacle outlet 66, and a third receptacle outlet 68. The system also includes a first electrical load 74, a second electrical load 76, a third electrical load 78, electrical conductors 84, electrical conductors 86 and electrical conductors 88. In the illustrated embodiment, the first receptacle outlet 64 supplies power from the UPS to the first electrical load via electrical conductors 84, the second receptacle outlet 66 supplies power to the second electrical load 76 via electrical conductors 86 and the third receptacle outlet 68 supplies power from the UPS to the third electrical load 78 via electrical conductors 88. According to one embodiment, one or more of the electrical conductors include a plug-in power cord. According to one embodiment, the communication network 70 connects the UPS 62 to each of the first electrical load 74, the second electrical load 76, and the third electrical load 78 to provide communication between the UPS 62 and the electrical loads over the network using a web-based protocol.

In accordance with one embodiment, the UPS 62 includes a first configuration 94 associated with turning off power to the first receptacle outlet 64, a second configuration 96 which is associated with turning off power to the second receptacle outlet 66 and a third configuration 98 which is associated with turning off power to the third receptacle outlet 68. In accordance with one embodiment, the first configuration 94, the second configuration 96, and the third configuration 98 are included in the control unit, for example, the control unit 34 as illustrated in FIG. 1. Further, each of the shut-down configurations can be executed independently of one another such that the UPS 62 may be described as including a plurality of virtual UPSs, for example, a first virtual UPS 57, a second UPS virtual 58, and a third virtual UPS 59. Specifically, from the perspective of the isolation of the separate electrical loads 74, 76, 78, each electrical load can be shut down independently of any of the other electrical loads which may also be connected to other switched receptacle outlets.

In general, the configurations 94, 96, 98 can include one or more conditions that are evaluated to determine whether an individual receptacle outlet or associated group of a plurality of receptacle outlets should be shut down (or, if previously shutdown, re-connected to the output of the UPS). These conditions can include conditions concerning the status of the electrical load connected to the receptacle outlet, the status of the UPS, the status of both the UPS and the electrical load connected to the receptacle outlet and any other information that may be relevant to determining whether conditions warrant a shut down of the electrical load connected to the receptacle outlet(s) associated with the configuration. As mentioned above, the conditions that would warrant such a shut down may be customized for a particular application, therefore, a single UPS can include shut down conditions that are customized for each virtual UPS provided by the UPS 62.

Some of the conditions concerning the UPS that may be relevant to whether an electrical load can be shutdown include the expected run time of the UPS, for example, the expected run time of the UPS given a current loading while the UPS is on battery and is not being supplied an AC input. In addition, other conditions including the battery voltage, the state of charge of the battery, the capacity of the battery, the status of the AC input, the instantaneous demand on the UPS and conditions concerning the environment of the UPS, for example, the temperature of the UPS (or the ambient temperature of the surrounding environment) may be included in any of the configurations 94, 96, 98. The preceding provide some examples and are not intended to limit the conditions to those listed. Other conditions may be employed.

Conditions concerning the UPS can also be relevant to whether an electrical load can be re-connected to the UPS. In some embodiments, timers are employed to determine an elapsed time since AC power was restored at the input 38. In one embodiment, receptacle outlets are reconnected following a predetermined period following the restoration of AC power at the input. Further, in some embodiments, the outlets that supply less critical electrical loads are reconnected some time after the connection of outlets that supply more important electrical loads.

Conditions concerning the load that may be relevant can include user-defined conditions. For example, a virtual UPS can be shut down based on the time of day (for example, a periodic shut down that is scheduled in the interest of conserving energy during periods when the connected load is not used by end users). In particular, where the electrical load is a computer, there may be periods during the day, for example, in the evening or early morning hours where all computing resources are not required such that one or more of the connected computers can be turned off to conserve power or to reduce power consumption. Further, in some embodiments, an outlet or group of outlets is not shutdown until the UPS receives an indication from the connected electrical load that it is ready to be de-energized. For example, a server may shut itself down and then signal that it is ready to be de-energized.

In addition to the preceding, in accordance with some embodiments, the unique configurations available for each of the virtual UPSs 57, 58, 59 allow a user to further customize the operation of the electrical load without impacting others of the electrical loads connected to the UPS 62.

Because, the network allows direct communication between the UPS 62 and each of the individual electrical loads 74, 76, 78 the status of the connected loads can be provided to the control unit to determine whether the associated virtual UPS should operate to turn off power supplied to the receptacle outlet(s) included in the virtual UPS. However, in accordance with some embodiments, the status of the electrical load is not included in the shutdown conditions.

Figure 4:
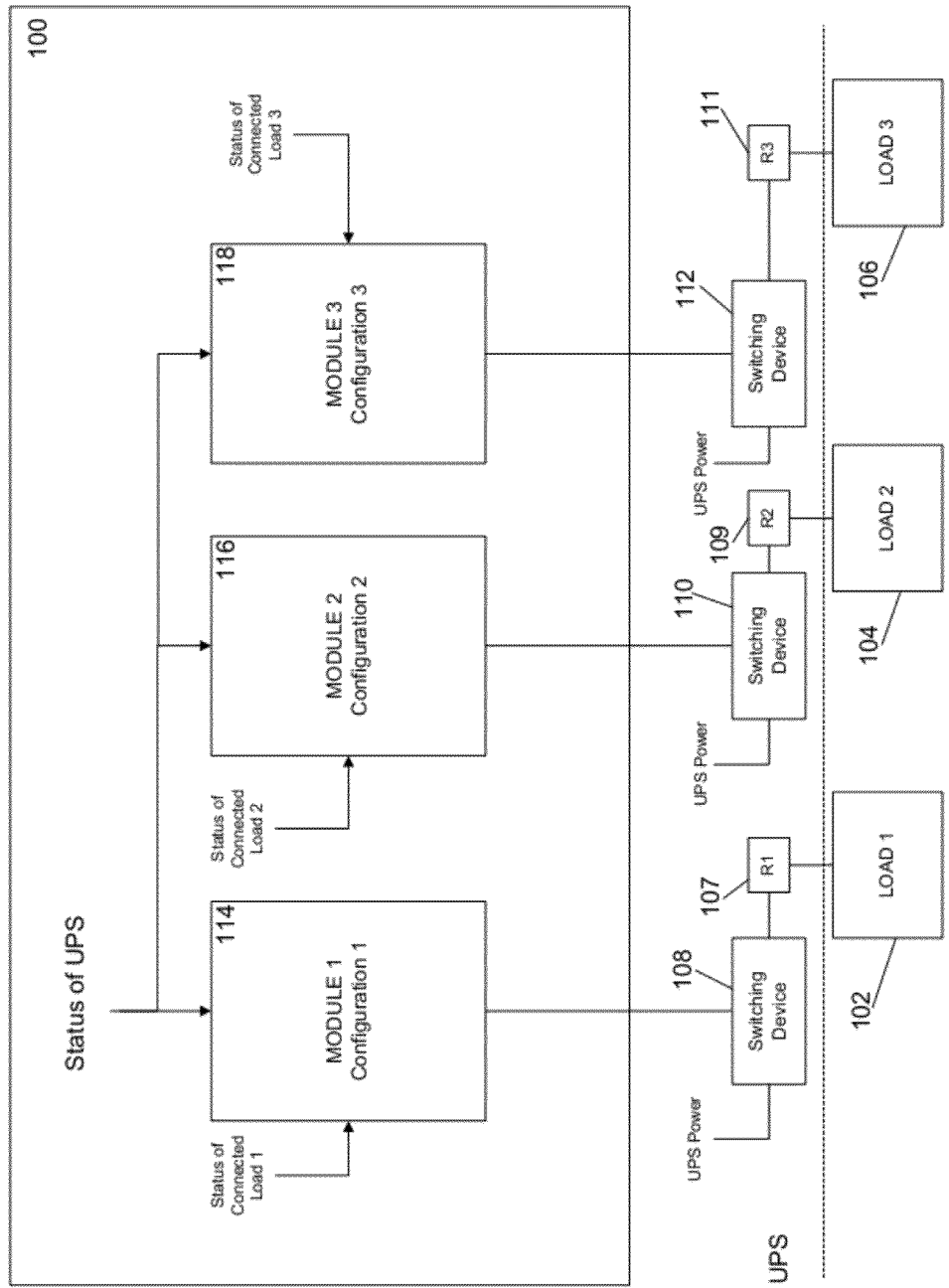
FIG. 4 illustrates a block diagram of a control unit in accordance with an embodiment of the invention.

As mentioned above, the configuration profiles 94, 96, 98 may be included in a control unit in the UPS in accordance with one embodiment. Referring now to FIG. 4, a control unit 100 is illustrated in accordance with an embodiment. As illustrated in FIG. 4, a control unit is included in a UPS that supplies power to a first electrical load 102, a second electrical load 104, and a third electrical load 106. According to one embodiment, the UPS includes a first receptacle outlet 107, a first switching device 108, a second receptacle outlet 109, a second switching device 110, a third receptacle outlet 111 and a third switching device 112. Further, power is supplied from the UPS to each of the electrical loads 102, 104, 106 via the first receptacle outlet 107 and the first switching device 108, the second receptacle outlet 109 and the second switching device 110, and the third receptacle outlet 111 and the third switching device 112, respectively. As explained above, the power supplied from the UPS is AC power provided at the output of the UPS and the switching devices act to isolate a respective receptacle outlet or group of receptacle outlets from the output of the UPS, for example, to deenergize an electrical load.

As illustrated in FIG. 4, each of the switching devices 108, 110, 112 is operated based on a configuration that can be customized for the load to which the respective switching device is connected. Accordingly, the control unit 100 includes a first module 114 which includes a first configuration, a second module 116 that includes a second configuration and a third module 118 that includes a third configuration. Further, although each module includes a separate configuration that can be customized for a particular receptacle outlet(s) and electrical load(s) each of the first module 114, the second module 116, and the third module 118 can include unique configurations or the same configuration.

In the illustrated embodiment, each module includes at least two inputs, a first input concerns the status of the UPS and a second input concerns the status of the load connected to the receptacle outlet or group of receptacle outlets connected to the switching device associated with the module. Further, as described above, each configuration may employ conditions to initiate the operation of the switching device to turn off power to the connected load based on the status of the connected load and/or the status of the UPS or any of the preceding and other conditions relevant to operation of the load and/or the UPS in combination. Further, the modules and associated configuration may also be employed to turn on power to the connected load.

As one example, the operation of the electrical loads may be prioritized with Load 1 having the highest priority, Load 2 having an intermediate priority and Load 3 106 having the lowest priority. In this example, the status of the UPS and the expected run time are employed to determine whether one or more of the switching devices should be operated to isolate the associated electrical load. In a first example, a loss of AC input power supplying the UPS may be employed by the second module 116 and the third module 118 to substantially immediately generate an output that causes the switching device 110 and the switching device 112, respectively, to disconnect the receptacle outlets the second receptacle outlet 109 and the third receptacle outlet 111 (and as a result, the second electrical load 104 and the third electrical load 106) from the output of the UPS. In addition, the first module 114 may include a configuration that allows the first electrical load 102 to continue to operate and remain connected to the UPS output until such time as the expected run time of the UPS drops below a predetermined threshold. In accordance with one embodiment, this approach is employed to ensure that the charge on the batteries included in the UPS does not drop below the predetermined level.

In a further embodiment, the modules 114, 116, 118 may be configured differently such that three separate predetermined thresholds are established, for example, a first threshold based on a first value of the expected runtime, a second threshold based on a second value of the expected runtime and a third threshold based on a third value of the expected runtime. According to one example of this embodiment, module 1 operates to provide a signal to open the first switching device 108 when the first threshold is reached, module 2 operates to provide a signal to open the second switching device 110 when the second threshold is reached and module 3 operates to provide a signal to open the third switching device 112 when the third threshold is reached. For example, the first module 114 can be configured to turn off power to the first electrical load 102 when the expected run time decreases to ninety percent of nominal, the second module 116 can be configured to turn off power supplied to the second electrical load 104 when the expected run time decreases to seventy percent and the third module 118 can be configured to turn off power to the third electrical load 106 when the expected run time decrease to fifty percent. Thus, the UPS can provide power to a critical load for a period of time after other loads have been disconnected.

In various embodiments, the modules 114, 116, 118 can include hardware, software or a combination of hardware and software. For example, in one embodiment, the modules 114, 116, 118 include algorithms that employ the conditions specified for the shutdown of the loads 102, 104 and 106, respectively, to determine whether a shutdown condition has occurred. In one embodiment, each module includes a separate algorithm while in an alternate embodiment, a single algorithm processes the conditions/variables provided by each of the modules 114, 116 118 to determine whether the module should initiate an operation (either opening or closing) of the switching device with which it is associated. In a further embodiment, the functionality of the nodules 114, 116 and 118 are provided in a single module. According to one embodiment, the single module includes an algorithm that can operate on one set of variables or a plurality of sets of variables, for example, a first set of variables corresponding to a first configuration for a first receptacle outlet(s) and a second set of variables corresponding to a second configuration for a second receptacle outlet(s).

The embodiments described herein may be employed with any type off electrical load supplied by a UPS. For example, embodiments may be employed with data center load including computers, servers, printers and other peripherals, HVAC equipment, lighting and receptacles, etc.

In some embodiments, a configuration of the UPS may be performed with software, for example, software that may be loaded on the UPS 12. Accordingly, in some embodiments, a computer readable medium stores sequences of instructions including instructions that will cause a processor to perform a method of isolating a first power outlet included in a UPS from an output of the UPS where the UPS also includes a second power outlet configured to be coupled to an electrical load. In some embodiments, the method includes acts of receiving configuration information, including information concerning a first condition that is independent of the second power outlet and the second electrical load, and determining whether to disconnect the first power outlet from the output based on the first condition. According to a further embodiment, the first power outlet is configured to supply power to a first electrical load, and the first condition concerns at least one of a status of the UPS and a status of the first electrical load.

This preceding is just one example of such an embodiment. Other embodiments, including those directed to configuring one or more modules with configurations for independently isolating power outlets of a UPS may also be similarly stored and executed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A UPS, comprising:
a first input configured to couple to a primary source of power;
a second input configured to couple to a secondary source of power;
an output, wherein the UPS is configured to provide power supplied from the second source of power to the output when the primary source of power is unavailable;
a first switched receptacle outlet coupled to the output and configured to be coupled to a first electrical load;
a second switched receptacle outlet coupled to the output and configured to be coupled to a second electrical load; and
a control unit in communication with each of the first load and the second load,
wherein the control unit is configured to communicate with the first electrical load and the second electrical load, respectively,
wherein the control unit is configured to establish a first configuration employed to isolate the first electrical load from the output based on information communicated from the first load and a first condition of the UPS, and
wherein the control unit is configured to establish a second configuration employed to isolate the second electrical load from the output based on information communicated from the second load and a second condition of the UPS.

2. The UPS of claim 1, further comprising a housing enclosing the UPS, wherein each of the first switched receptacle outlet and the second receptacle outlet are located at an exterior surface of the housing.

3. The UPS of claim 1, wherein at least one of the first switched receptacle outlet and the second receptacle outlet includes a plurality of switched receptacle outlets.

4. The UPS of claim 1, further comprising an interface coupled to the control unit and configured to provide the communication with each of the first load and the second load,
wherein the interface is configured to allow a configuration of the control unit over a network using a web-based protocol.

5. The UPS of claim 4, wherein the interface is configured to be employed in configuring the control unit with the second configuration over the network using the web-based protocol.

6. The UPS of claim 1, wherein the control unit is configured to disconnect the first switched receptacle outlet from the output based on the first configuration.

7. The UPS of claim 6, wherein the DC power source includes a battery, and wherein the first condition of the UPS is evaluated at least in part by a capacity of the battery.

8. The UPS of claim 1, wherein a status of the first electrical load communicated to the UPS includes an on/off status of the first electrical load.

9. The UPS of claim 1, wherein the UPS further comprises:
a first switching device coupled to the output and the first switched receptacle outlet; and
a second switching device coupled to the output and the second receptacle outlet,
wherein the control unit is further configured to control an operation of the first switching device and an operation of the second switching device.

10. The UPS of claim 9, wherein the control unit generates a signal based at least on a condition included in the first configuration being met, and wherein the signal is received by the first switching device which acts to operate the first switching device to disconnect the first switched receptacle outlet from the output following receipt of the signal.

11. A method of controlling a first power outlet and a second power outlet included in a UPS, the first power outlet coupled to an output of the UPS and supplying power to a first electrical load and the second power outlet coupled to the output of the UPS and supplying power to a second electrical load, the UPS including a control unit, the method comprising acts of:
- communicating information from the first electrical load to the control unit;
- configuring the UPS to control an on/off status of the first power outlet based on a first condition that concerns a first status of the UPS and a status of the first electrical load;
- communicating information from the second electrical load to the control unit; and
- configuring the UPS to control an on/off status of the second power outlet based on a second condition that concerns a second status of the UPS and status of the second electrical load.

12. The method of claim 11, further comprising acts of:
- configuring the UPS to turn off power to a first plurality of power outlets included in the UPS based on the first condition, wherein the first power outlet is included in the first plurality of power outlets; and
- configuring the UPS to turn off power to a second plurality of power outlets included in the UPS based on a second condition, wherein the second power outlet is included in the second plurality of power outlets, and wherein the second condition is independent of a status of the first electrical load.

13. The method of claim 12, wherein the UPS includes a DC power source, and wherein the method further comprises an act of determining whether each of the first condition is met and the second condition is met based at least in part on an expected runtime of the UPS supplying power to the first electrical load and the second electrical load from the DC power source.

14. The method of claim 11, wherein the UPS includes a battery, and wherein the first condition includes a charge state of the battery.

15. The method of claim 11, wherein the acts of communicating include communicating over a network using a web-based protocol.

16. The method of claim 11, further comprising acts of:
- configuring the UPS to turn off power to the first power outlet based on the first condition and to turn on power to the first power outlet based on a third condition that is different than the first condition; and
- configuring the UPS to turn off power to the second power outlet based on the second condition and to turn on power to the second power outlet based on a fourth condition that is different than the second condition.

17. A computer readable medium having stored thereon sequences of instructions including instructions that will cause a processor to perform a method of isolating each of a first power outlet and a second power outlet included in a UPS from an output of the UPS where the first power outlet is configured to be coupled to a first electrical load and the second power outlet is configured to be coupled to a second electrical load, the method comprising acts of:
- communicating information from the first electrical load to the UPS;
- configuring the UPS to control an on/off status of the first power outlet based on a first condition that concerns a first status of the UPS and a status of the first electrical load;
- communicating information from the second electrical load to the UPS; and
- configuring the UPS to control an on/off status of the second power outlet based on a second condition that concerns a second status of the UPS and a status of the second electrical load.

18. The computer readable medium of claim 17, wherein the acts of communicating include communicating over a network.

19. The computer readable medium of claim 18, wherein the method further comprises an act of configuring the UPS to selectively turn off power to the first power outlet and the second power outlet based on a first shutdown configuration and a second shutdown configuration, respectively, regardless of whether a connection of the UPS to the network is available.

* * * * *